C. O. HUNTINGTON.
ADJUSTABLE SAW GUARD.
APPLICATION FILED JULY 29, 1913.

1,095,399.

Patented May 5, 1914.

WITNESSES:
Karl S. Brown.
Irene R. Bowman.

INVENTOR.
Cory O. Huntington
BY
J. H. Mock.
ATTORNEY.

UNITED STATES PATENT OFFICE.

CORY O. HUNTINGTON, OF CENTRALIA, WASHINGTON, ASSIGNOR OF ONE-HALF TO SAMUEL A. AGNEW, OF CENTRALIA, WASHINGTON.

ADJUSTABLE SAW-GUARD.

1,095,399.

Specification of Letters Patent.

Patented May 5, 1914.

Application filed July 29, 1913. Serial No. 781,769.

*To all whom it may concern:*

Be it known that I, CORY O. HUNTINGTON, a citizen of the United States, residing at Centralia, in the county of Lewis and State of Washington, have invented certain new and useful Improvements in Adjustable Saw-Guards, of which the following is a specification.

My invention relates to adjustable saw guards, and has for its object to provide a protector for trimmer saws which will automatically retain its position over the saw to prevent the exposure of the teeth to the workman during his operations as the saw frame swings to and fro. I accomplish this object by means of the structure illustrated in the accompanying drawing, in which—

Figure 1:
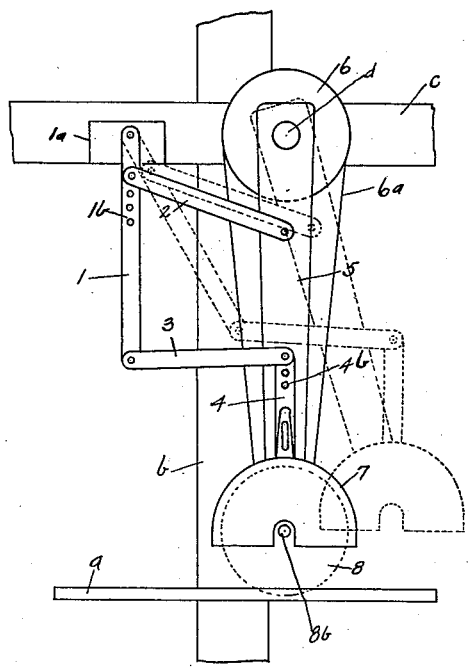
Figure 2:
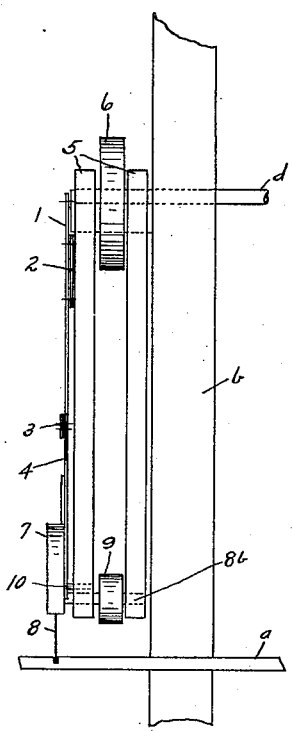
Figure 3:
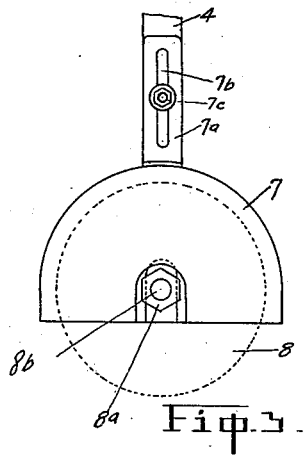
Figure 4:
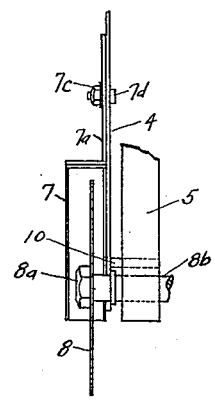

Figure 1 is a side elevation showing a saw frame mounted on a trimming table, with my improved hood and adjusting mechanism installed thereon. Fig. 2 is an end or edge view of same. Fig. 3 is a detail side elevation of the hood or protector showing the manner of its mounting. Fig. 4 is an edge view of same.

Describing the drawing in detail, $a$ designates a trimming table, adjacent to the mill post $b$, to which is secured the cross beam $c$; and mounted in the cross beam in the usual manner is a line shaft $d$. From the line shaft is suspended the swinging saw frame, consisting of two members 5, between which is fixed upon said shaft a pulley 6 carrying a belt $6^a$ which works over the lower pulley 9 fixed upon the saw shaft $8^b$ at the lower end of the saw frame. Upon the terminal of the saw shaft is fixed the saw 8, held in place by means of the nut $8^a$. From a convenient point in the mill frame work, as from the cross beam $c$, is pivotally suspended, by means of a bracket or other suitable support $1^a$, a link 1. To the upper portion of this link is adjustably secured upon a pivot pin, in the apertures $1^b$ the connecting link 2, which is similarly secured upon the member 5 of the saw frame adjacent the saw.

To the lower end of link 1 is pivoted another transverse link 3, which in turn is adjustably secured upon a pivot pin in the apertures $4^b$ in the upper end of the link 4 which may be pivoted at its lower end upon the saw shaft, though I prefer to mount it upon a separate journal 10, fixed in the frame 5 very near the saw shaft. To the link 4, by means of an arm or bracket $7^a$, is secured a hood 7 adapted to encompass the upper portion of the saw 8. The hood is intended to stand a short distance above the table $a$, so as to permit the work on the table to pass beneath; and it is made vertically adjustable by reason of the slot $7^b$, through which the bolt $7^d$ passes and which retains the hood by means of the nut $7^c$, in the desired position.

By adjusting the links 2 and 3 in the apertures $1^b$ and $4^b$ respectively, it is possible to preserve the bracket $7^a$ in a vertical position, so that as the frame 5 is swung forward, as seen in dotted lines in Fig. 1, the hood will maintain a horizontal position, and thereby cover the greater portion of the saw. It will thus lessen the possibility of injury from the saw, which might occur if the hood could tilt on its axis as the frame 5 does, with reference to the saw shaft.

It is obvious that by a further adjustment of said links the hood may be made to tilt on its axis, in a direction opposite to that of the frame 5, which would have the effect of covering those teeth on that side of the saw which would be moving forward.

Having thus described my invention, what I claim, is—

1. A guard for swinging saws, comprising in combination with a saw frame carrying a saw and mounted to oscillate, a hood for covering the saw secured to the saw frame, a link mechanism pivoted to said hood by one end and having an independent pivotal connection for its opposite end and a pivotal connection between the link mechanism and said frame for automatically preserving the hood in substantially horizontal position as the frame swings on its pivot.

2. A guard for swinging saws comprising in combination with a table and saw frame carrying a saw pivoted to oscillate thereon, a hood secured upon said frame in position to cover the saw and projecting to the front and rear thereof, and a link mechanism secured independently of the swinging frame and connected with said hood for preserving the hood in substantial parallelism with the table as the frame swings on its pivot.

3. A guard for swinging saws comprising in combination with a table and saw frame carrying a saw pivoted to oscillate thereon, a hood secured upon said frame in position to cover the saw and projecting to the front and rear thereof a link mechanism secured independently of the swinging frame and connected with said hood for preserving the hood in substantial parallelism with the table as the frame swings on its pivot and means for vertically adjusting the hood with reference to the position of the saw.

4. A guard for swinging saws comprising in combination with a table and saw frame carrying a saw pivoted to oscillate thereon, a hood secured upon said frame in position to cover the saw and projecting to the front and rear thereof, a link mechanism secured independently of the swinging frame and connected with said hood for preserving the hood in substantial parallelism with the table as the frame swings on its pivot, means for vertically adjusting the hood with reference to the position of the saw, and for adjusting the link mechanism to increase or diminish the relative movement of the hood.

In testimony whereof I affix my signature in the presence of two witnesses.

CORY O. HUNTINGTON.

Witnesses:
E. EARL FEIKE,
HAZEL A. ARMSTRONG.

---

Copies of this patent may be obtained for five cents each, by addressing the "Commissioner of Patents, Washington, D. C."